US006962495B2

(12) United States Patent
Bajer et al.

(10) Patent No.: US 6,962,495 B2
(45) Date of Patent: *Nov. 8, 2005

(54) COMPUTER ENABLED TRAINING OF A USER TO VALIDATE ASSUMPTIONS

(75) Inventors: Javier Bajer, Godalming (GB); Timothy Gbedemah, London (GB)

(73) Assignee: Indeliq, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/806,983

(22) Filed: Mar. 23, 2004

(65) Prior Publication Data

US 2004/0175681 A1 Sep. 9, 2004

Related U.S. Application Data

(63) Continuation of application No. 09/935,348, filed on Aug. 22, 2001, now Pat. No. 6,736,642, which is a continuation of application No. 09/387,618, filed on Aug. 31, 1999, now abandoned, which is a continuation of application No. 09/386,895, filed on Aug. 31, 1999, now abandoned, which is a continuation of application No. 09/387,193, filed on Aug. 31, 1999, now abandoned, which is a continuation of application No. 09/387,748, filed on Aug. 31, 1999, now abandoned.

(51) Int. Cl.[7] .............................................. G09B 11/00
(52) U.S. Cl. ....................... 434/323; 434/353; 345/700
(58) Field of Search ................................ 434/322, 323, 434/350, 353, 362, 238; 345/700

(56) References Cited

U.S. PATENT DOCUMENTS

| 5,616,033 A | * | 4/1997 | Kerwin ........................ 434/118 |
| 5,754,189 A | * | 5/1998 | Doi et al. .................... 345/473 |
| 5,791,907 A | * | 8/1998 | Ramshaw et al. .......... 434/262 |
| 6,091,930 A | * | 7/2000 | Mortimer et al. ........... 434/362 |
| 6,155,840 A | * | 12/2000 | Sallette ........................ 434/323 |
| 6,736,642 B2 | * | 5/2004 | Bajer et al. ................. 434/236 |

* cited by examiner

Primary Examiner—Xuan M. Thai
Assistant Examiner—Kathleen M. Christman
(74) Attorney, Agent, or Firm—Banner & Witcoff, Ltd.

(57) ABSTRACT

A system, method and article of manufacture are disclosed which implement a training session for training a user to validate assumptions. First, a plurality stimuli are presented to a user in the context of a simulation. The user is then prompted to enter responses to the stimuli which are subsequently recorded. The user is then allowed to enter assumptions that form a basis of the responses. Next, the user is prompted to enter information on how to validate the assumptions which is subsequently received. Feedback is then outputted based on the stimuli and responses. Such feedback relates to appropriate assumptions and information on how to validate the appropriate assumptions. As an option, the feedback may be further based on a number of assumptions entered.

11 Claims, 9 Drawing Sheets

COMPUTER ENABLED TRAINING OF A USER TO VALIDATE ASSUMPTIONS

This application is a continuation of application Ser. No. 09/935,348, filed Aug. 22, 2001, now U.S. Pat. No. 6,736,642 granted May 18, 2004, the disclosure of which is incorporate herein by reference, which is a continuation of applications Ser. Nos. 09/387,618, 09/386,895, 09/387,193, and 09/387,748 all filed Aug. 31, 1999 and now abandoned.

FIELD OF THE INVENTION

The present invention relates to training software, and more particularly to training a user to validate assumptions on which his or her decisions are based.

BACKGROUND OF THE INVENTION

The behaviors, assumptions and attitudes of police officers are strongly influenced by the overall 'culture' of the service. The police service culture has been established and reinforced over many years. Police officers naturally tend to tolerate and conform to the behaviors, assumptions and attitudes common to the culture. They may find they are most effective as police officers if they behave in the way the culture demands, or they may feel they have to do so in order to 'fit in' and feel comfortable around fellow officers. They may not believe themselves to be acting or thinking in accord with any culture, and the actions in question may not be overt, conscious or deliberate. That is the nature and influence of an organization's culture and the way it is shared amongst the organization's members.

This is not unique to police service. Most public institutions, and likewise private sector firms, develop a culture of their own—with prevailing behaviors, assumptions, attitudes and vocabulary amongst their employees. Such a culture can be a positive strength. It can attract people to join and stay with an organization, and it can help people work well together in performing the organization's business.

Efforts to change the weaknesses in a culture must not destroy the strengths that help give an organization its effectiveness. But a culture has a problem when some of its consequences come to be judged unacceptable. For the police service, that public judgment has been reached, and is acknowledged by senior officers and officials.

The common thread of unacceptability is a police service culture with behaviors, assumptions and attitudes that fail to accommodate the differences between individuals, or worse, that are based on stereotypes of race, sex, age, or dress. It has been stated that it was not enough for police officers to be fair and to avoid acting on stereotypes by treating everyone the same. Instead, the challenge is to treat everybody as individuals.

Whilst the nature of policing is unique, this challenge of individualizing the treatment of all members of the public is not unique to the police service. It is one that is shared by many other public servants—by tax inspectors, employment and benefits advisers, fraud investigators, and all others who must offer public services to people with individual needs and circumstances, and must do so with equity.

For police and other public services, changing behavior towards individuals requires awareness of diversity amongst members of the public. But awareness of diversity does not produce change without the breaking down of old habits of behavior and action, and without the acquisition of new skills, including:

- being able to recognize one's own stereotypes and false assumptions about other people
- knowing how to determine quickly the important circumstances—emotional as well as physical—of each individual
- understanding how to deal with people according to these circumstances, as well as according to the equity of relevant policies and procedures.

These skills and behaviors are not easy for anyone to acquire, and it must also become a new habit for officers to apply them in both routine and exceptional circumstances on duty. Achieving this re-skilling and breaking down of old habits is at the heart of the challenge at hand.

It is a challenge similar to the one faced by many private sector companies seeking to win and retain consumer business. The nature of the diversity that needs to be recognized by a business may be different, and simpler, than that which the police service must recognize. The opportunity may exist for businesses to decide to ignore some apparently 'unprofitable' individuals; a moral luxury police service cannot have. And for the private sector, the consequences of failure to individualize treatment are seldom matters of life, death or basic human dignity for the individual concerned. At the center of individualized treatment is the awareness and validation of assumptions which may tend to cause the treatment of people in a generalized manner.

SUMMARY

A system, method and article of manufacture are disclosed which implement a training session for training a user to validate assumptions. First, a plurality stimuli are presented to a user in the context of a simulation. The user is then prompted to enter responses to the stimuli which are subsequently recorded. The user is then allowed to enter assumptions that form a basis of the responses. Next, the user is prompted to enter information on how to validate the assumptions which is subsequently received Feedback is then outputted based on the stimuli and responses. Such feedback relates to appropriate assumptions and information on how to validate the appropriate assumptions. As an option, the feedback may be further based on a number of assumptions entered.

In one embodiment, the stimuli may include a prerecorded audio clip, a prerecorded video clip, an animation, a graphic, a text presentation, a real-time audio stream, and/or a real-time video stream. Further, the user may be automatically prompted to enter the assumptions that form the basis of the responses and the information on how to validate the assumptions.

In another embodiment of the present invention, the simulation may include a police call regarding a situation with the stimuli including images of at least one person in the situation. Further, the responses may include questions for the person in order to collect evidence pertinent to the situation. The user may be prompted to enter the responses to the stimuli by listing a plurality of responses, and allowing the user to select between the listed responses.

As one aspect of the present invention, the stimuli and the responses are displayed after the receipt thereof in the form of a transcript during the course of the simulation. Similarly, the assumptions and the information on how to validate the assumptions may be displayed after the receipt thereof during the course of the simulation.

BRIEF DESCRIPTION OF THE DRAWINGS

The invention will be better understood when consideration is given to the following detailed description thereof. Such description makes reference to the annexed drawings wherein.

DETAILED DESCRIPTION

In accordance with at least one embodiment of the present invention, a system is provided for making a user, or student, aware of assumptions being made in various environments. In addition, the user may be trained on validating such assumptions of which he or she is aware. Such assumption awareness and validation is then reinforced by reversing the role of the user from a trainee to a trainer. This is all accomplished via a unique method of interaction that is facilitated by multiple user 10 interfaces.

Hardware Overview

Figure 1:
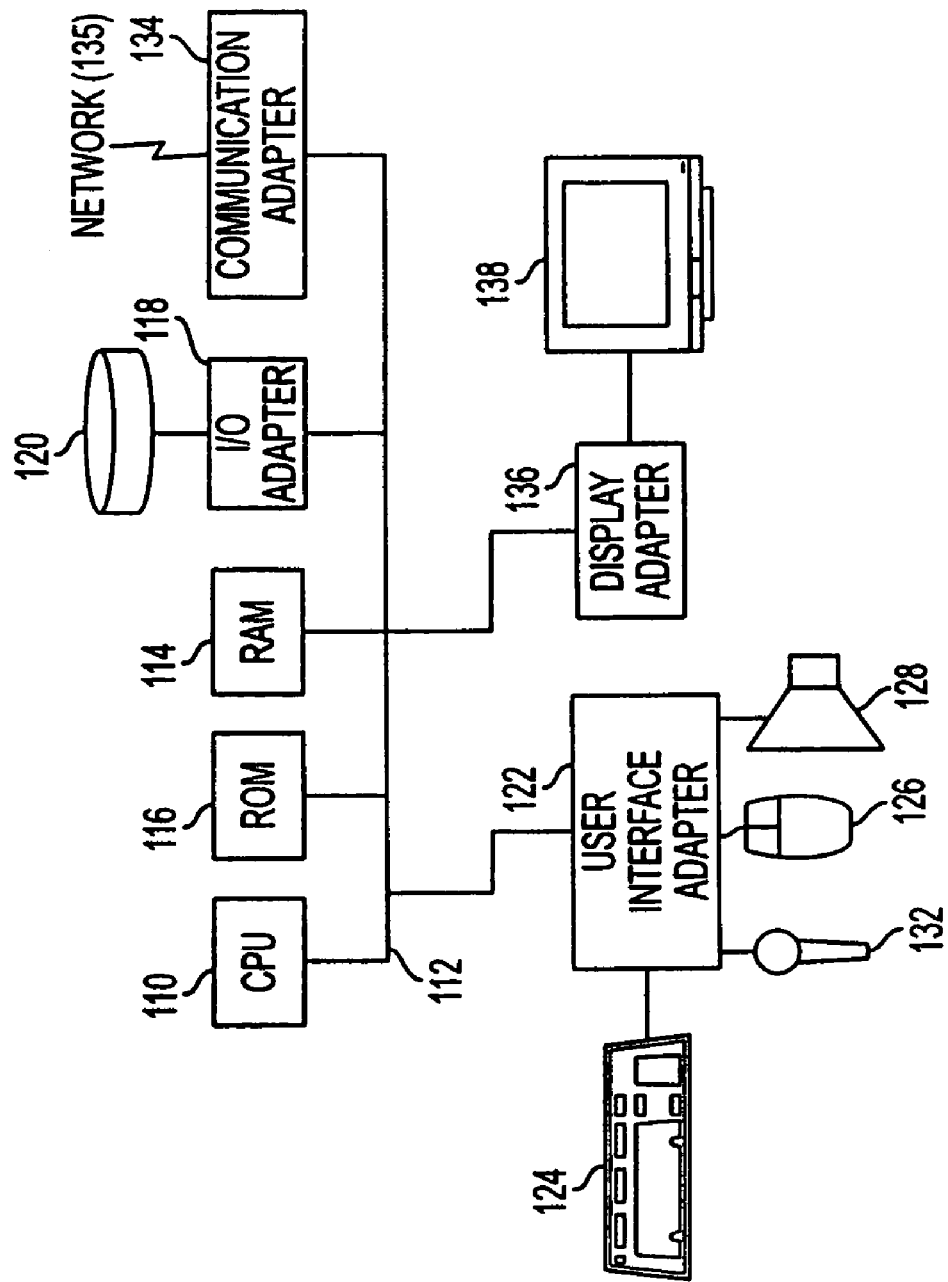
FIG. 1 is a schematic diagram of a hardware implementation of one embodiment of the present invention.

A representative hardware environment of a preferred embodiment of the present invention is depicted in FIG. 1, which illustrates a typical hardware configuration of a workstation having a central processing unit 110, such as a microprocessor, and a number of other units interconnected via a system bus 112. The workstation shown in FIG. 1 includes Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network, WAN, LAN, Internet) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system.

Software Overview

Object oriented programming (OOP) has become increasingly used to develop complex applications. As OOP moves toward the mainstream of software design and development, various software solutions require adaptation to make use of the benefits of OOP. A need exists for the principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each other's capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with them (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, the logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increase in the speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from 30 scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use.

Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making all these things work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that one can call when one want those individual behaviors in a program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and a company. HTTP or other protocols could be readily substituted for HTML without undue experimentation. Information on these products is available in T. Berners-Lee, D. Connoly, "RFC 1866: Hypertext Markup Language—2.0" (November 1995); and R Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the abovementioned custom UI components, dynamic Web pages can also be created.

Sun's Java language has emerged as an industry-recognized language for "programming the Internet." Sun defines Java as "a simple, object-oriented, distributed, interpreted, robust, secure, architecture-neutral, portable, high performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, which are fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Opening Interface

Figure 2:
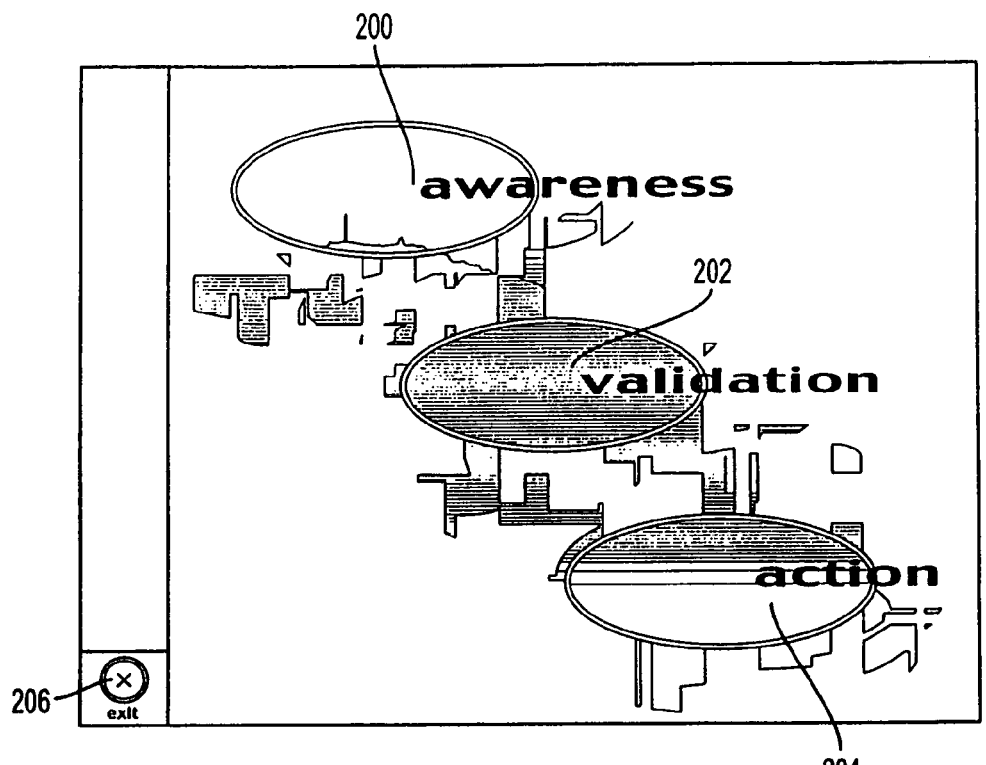
FIG. 2 is an initial screen with awareness, validation, and action buttons in accordance with one embodiment of the present invention.

Upon execution, a start-up screen is displayed. As shown in FIG. 2, three main buttons are visible including an 'Awareness' button 200, a 'Validation' button 202, and an 'Action' button 204. A cursor may be moved over each button for selection purposes. Further included is an Exit button 206 which may be clicked at anytime to shutdown the application.

In one embodiment, a 'virtual' coach playing the role of a tutor constable may introduce the learner to the training, setting their goals and expectations for the training in an audible or visual manner. In accordance with the three main buttons set forth hereinabove, the training afforded by the present invention is divided into three sections: Awareness, Validation, and Action.

Awareness Section

This section makes the learner cognizant of their behavior, in this case the practice of making assumptions. In the first stage of the training, the user learns that humans make assumptions all the time. The awareness section of the training is used to train the learner to become aware of the assumptions they are making Validation Section The second phase of the training shows the learner that it is important not only to be aware that they are making assumptions, but that they must validate those assumptions.

Action Section

The final stage in the training is comprised of 2 parts, first of all the learner swaps roles and plays the role of a 'tutor constable' coaching a 'virtual' learner about assumption making and validation. The reason to do this is that if one refers to Bloom's Taxonomy of Educational Objectives, the ultimate way to learn is to teach someone else what one have already learned.

The second stage of the action module is involved in learning alternative new behaviors for dealing with people when existing stereotypes or assumptions no longer fit.

The learner would begin the training with the first phase, "Awareness."

Awareness

Upon selection of the Awareness button 200 of FIG. 2, a computer implemented training session is initiated for identifying a user's assumptions in light of a reaction to a stimulus. Such training session is outlined in FIG. 3. Initially, in operation 350, a first portion of a stimulus, i.e. video, is presented to a user after which the user is prompted to enter a reaction to the first portion of the stimulus, as indicated by operation 352. The user's reaction to the first portion of the stimulus is then received and recorded in operations 354 and 356. Thereafter, a second portion of the stimulus is presented to the user in operation 358. This second portion of the stimulus is presented along with feedback adapted to identify how the user's reaction was based on an assumption. Note operation 360. During the course of the training session, the user may be provided access to a knowledge base to further achieve this goal. As an option, the feedback may be provided by an interactive coach.

In one embodiment, prior to presenting the second portion of the stimulus, the user is further prompted to enter an assumption that forms a basis of the user's reaction to the stimulus. Then, based on the assumption, feedback may be provided which helps the user become aware of the affects of the assumption on the response.

The user's reaction to the stimulus may include a text entry and/or a choice of presented options. Further, the form of the stimulus may range from a prerecorded audio clip, a prerecorded video clip, an animation, a graphic, a text presentation, a real-time audio stream, and/or a real-time video stream.

Figure 3A:
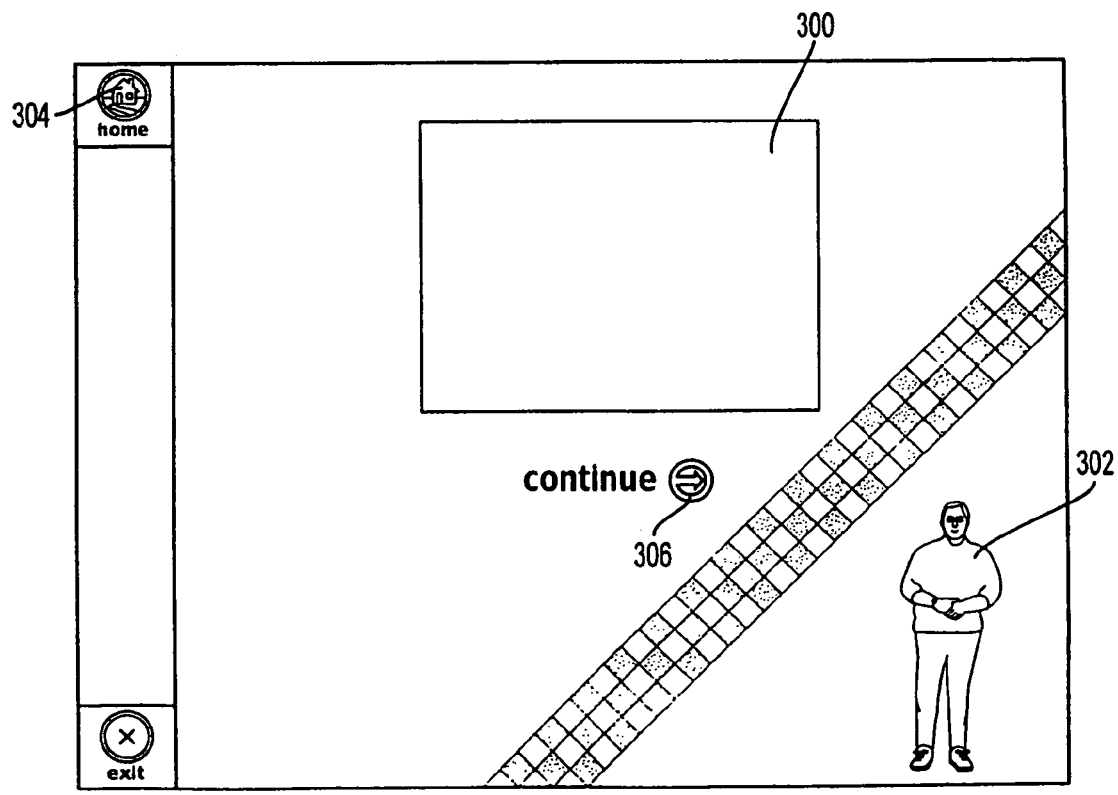
FIG. 3A is an initial screen of the awareness portion of the present invention that follows the main screen of FIG. 2.
Figure 3:
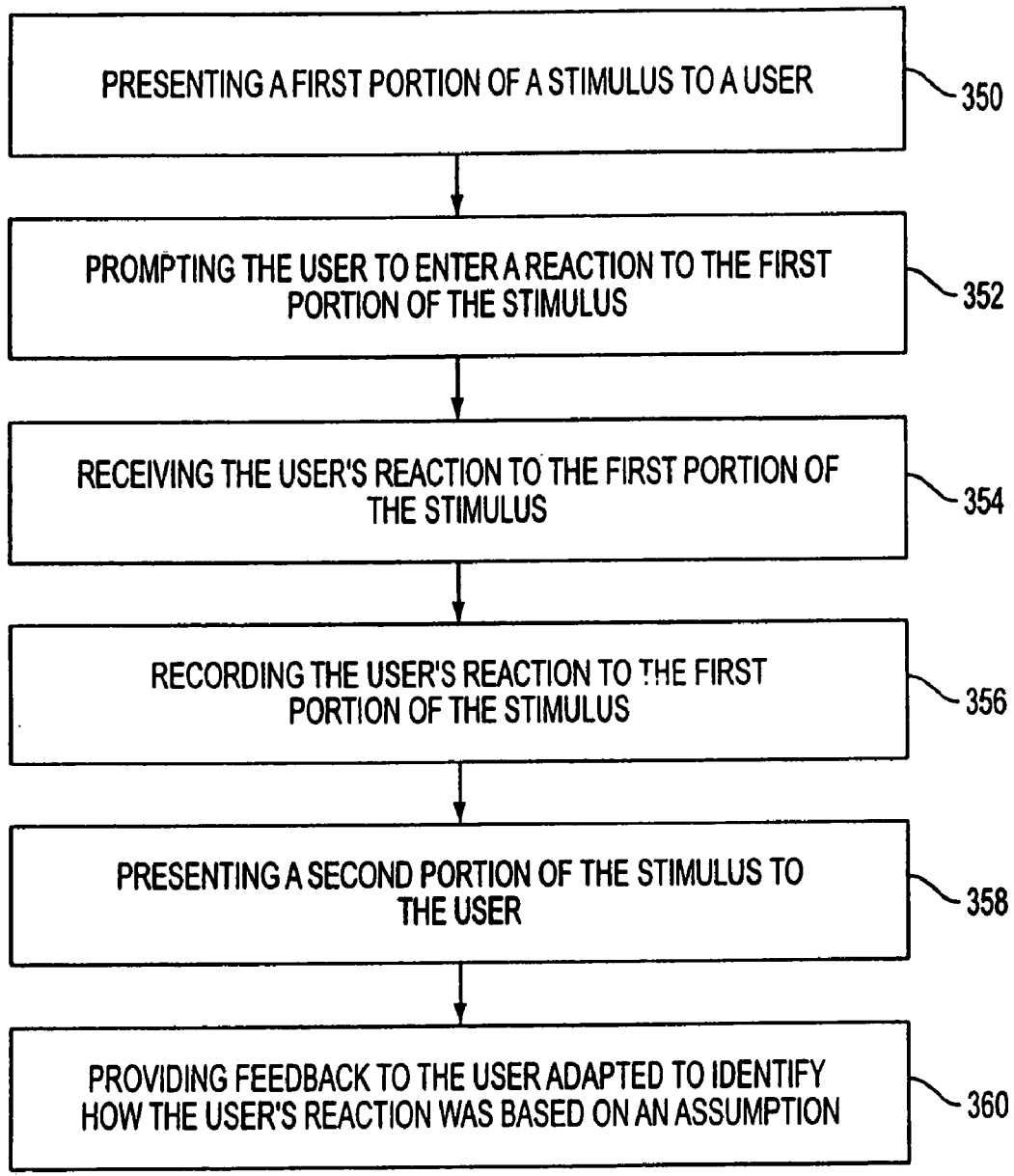
FIG. 3 is a flowchart delineating the method associated with the awareness portion of the present invention.

In the awareness portion of the present invention, the screen first changes to show a screen shown in FIG. 3A with a box 300 in the center thereof. Immediately, a video of a virtual coach 302 shows the coach 302 walking from the right hand side of the screen after which the coach 302 starts to talk to the user. This is the learner's 'virtual coach', it is there throughout the entire application, giving feedback, prompting the learner to reflect on what they are learning and setting the users expectations at each stage of the training.

The purpose of the virtual coach is to welcome the learner and explain how to use the application. The coach also explains that the learner is about to take part in a series of "What happens next" scenarios. To continue the user should press the 'continue' button and watch the first video. Then they ask to decide what happens next.

The screen of FIG. 3A includes two buttons including a home button 304. It should be noted that clicking on the home button 304 at anytime returns the user to the start screen of FIG. 2. The buttons further include a continue button 306 when the video of the virtual coach has ceased for continuing purposes.

Figure 4:
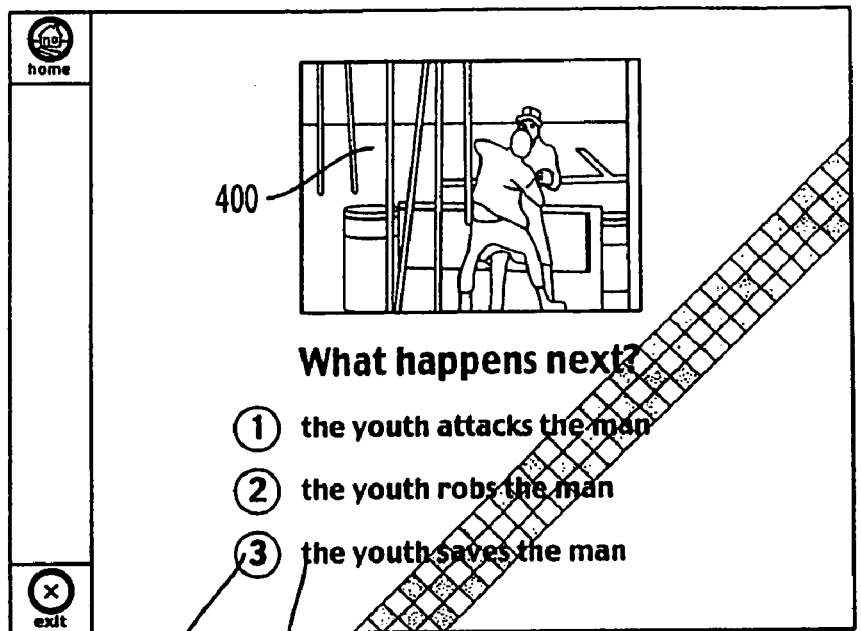
FIG. 4 is a screen of the awareness portion of the present invention that follows the screen of FIG. 3A.

The user may then click on the continue button 306 of FIG. 3A. As shown in FIG. 4, upon depression, a first portion of a stimulus 400, i.e. video, is displayed in the box 300 of FIG. 3A. As an example, a video may play of a youth running towards a suited man. When the video stops playing, the user is prompted to enter a reaction to the first portion of the stimulus. This may be accomplished by displaying a plurality of "what happens next?" scenarios 402 with respective options buttons 404. The user can choose, i.e. click, whichever option for 'what happens next?' that they believe is most appropriate.

Figure 5:
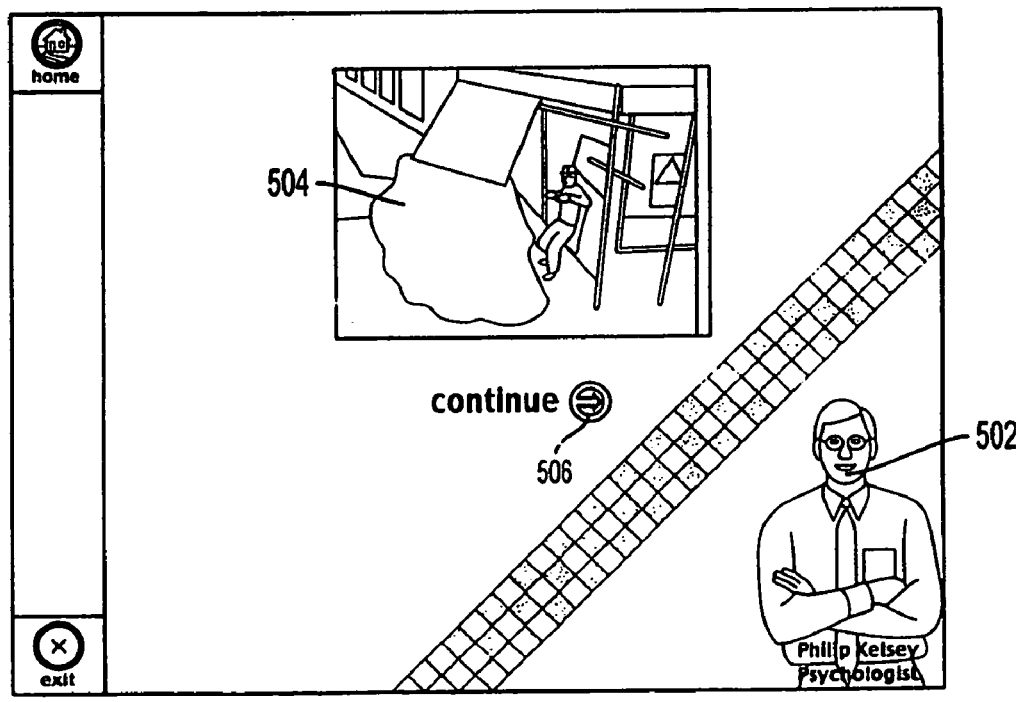
FIG. 5 is a screen of the awareness portion of the present invention that follows the screen of FIG. 4.

Upon selection of one of the scenarios 402 of FIG. 4, the chosen option appears on the screen, and a second portion of the stimulus is presented. As shown in FIG. 5, the second portion of the stimulus 504 may take the form of the end of the video showing the man walking into danger and the youth saving him.

Automatically, a virtual psychologist 502 appears on the screen and a voice over starts to explain "assumption making is a natural process . . . " for identifying how the user's reaction was based on an assumption. In particular, the virtual psychologist appears to point out to that assumption making is a natural and acceptable behavior that is in use in everyday life.

Should the learner have chosen the correct assumption, the virtual psychologist's feedback would have changed to start "well done you chose the correct option, but on the whole most people would have assumed that . . . " The training application always provides tailored feedback to the learner, driven by their actions. It is important to at this point to assure the learner that they are doing nothing wrong by making assumptions. The learning point here is that people make assumptions but should also learn to confirm the assumptions that are made.

The learner is then prompted to try another scenario by clicking on a continue button 10 506.

By click on the continue button 506, additional stimuli may be presented in a manner similar to that set forth hereinabove in addition to providing guidance by a virtual consultant. For example, a picture of an elderly man on a beach may appear along with a title "What is an assumption?" At this time, the virtual psychologist 502 would point out at this time what constitutes an assumption, i.e. the way a person is dressed, their surroundings and personal experiences in a similar situation leads one to draw certain conclusions about a person. For example, in the present picture with the elderly man on the beach, it might be assumed that the elderly gentleman does not constitute any threat to us. One might have made that assumption because he is smiling and appears to be happily strolling along the beach. He may also have a walking stick so as not to be physically threatening.

By clicking on another continue button, the picture may change to show a younger man on the beach. Again, the virtual psychologist 502 may state that assumptions about the situation may now have changed because the person on the beach has changed, but it is still not a threatening situation.

By clicking again on another continue button, the picture may change to show the same image of the young man in a different environment, namely a riot scene. The virtual psychologist 502 may then state that the assumptions that one is making about the person are completely different. One might now assume that the scene is highly dangerous and that the young man is threatening and poses a significant danger.

The foregoing process thus aids in determining what an assumption constitutes. With that, the first portion of the video of FIG. 4, or a similar video, is presented to the user. When the first portion of the video stops playing, "what happens next?" scenarios and three options buttons appear similar to as before.

Again, the learner can choose whichever option for 'what happens next?' that they believe is most appropriate. At this point the learner is probably automatically reflecting on what assumptions they are making, and they will be aiming not be 'tricked' into making a false assumption again.

To further enhance learning, the language "you expected" and the chosen option then appear on screen. Thereafter, the virtual coach appears and a text box "based on what assumptions" appears, prompting the learner to type in the assumptions that they made in order to choose the option they did. In this section of the training, the purpose is to start to elevate assumption making to the meta-cognitive level, i.e. learner has started to think about the assumptions they are making.

Upon entry of the assumptions by the user, the text "Based on the assumption that" and the free text typed appears on screen. In summary, beneath the display while depicting the second portion of the video, the text "You expected (selected option) based on (entered assumption), and this happened: (description of second portion of video)" is depicted. With this textual description, the user is made aware of the existence of assumptions in his or her decision making. It should be noted that the present embodiment is not limited to a video having two portions, but rather may be a video with multiple breaks which are handled in a similar manner.

Next, if the example of the youth that saves the man is used, the psychologist 502 appears again to explain that most people would have assumed that because the youth looked aggressive—because of his clothing/haircut and actions—they would have expected him to attack the man in the suit.

Evidently this wasn't the case, and this is an important learning point—this is what can happen when assumptions are made but not validated, i.e. the wrong conclusions are drawn. It is critical that the learner learns to validate the assumptions that they make.

During the course of the training application, the user is expected to complete more 'What happens next?' scenarios, each time inputting the assumptions that they are making about the characters and situations in the videos. This encourages the learner to think about assumption making, the assumptions that they themselves make and how those can be both correct and incorrect.

At the end of the 'Awareness' phase a 'point of reflection' may be added 'Points of Reflection' are a critical part of 'learning by practice' since they give the user an opportunity to think about their actions—what they have learned and what they might change going forward.

The virtual coach may give the user feedback on the options that they chose throughout the scenarios and prompt the user of the necessity to validate the assumptions that were made. The virtual coach then prompts the learner to practice validating their assumptions in part two of the training, namely 'Validation'.

Validation

When desired, the validation portion of the present invention may be accessed by clicking on the home button on a current screen and returning to the main screen of FIG. 2. At the main screen, the validation button may then be depressed.

Figure 6:
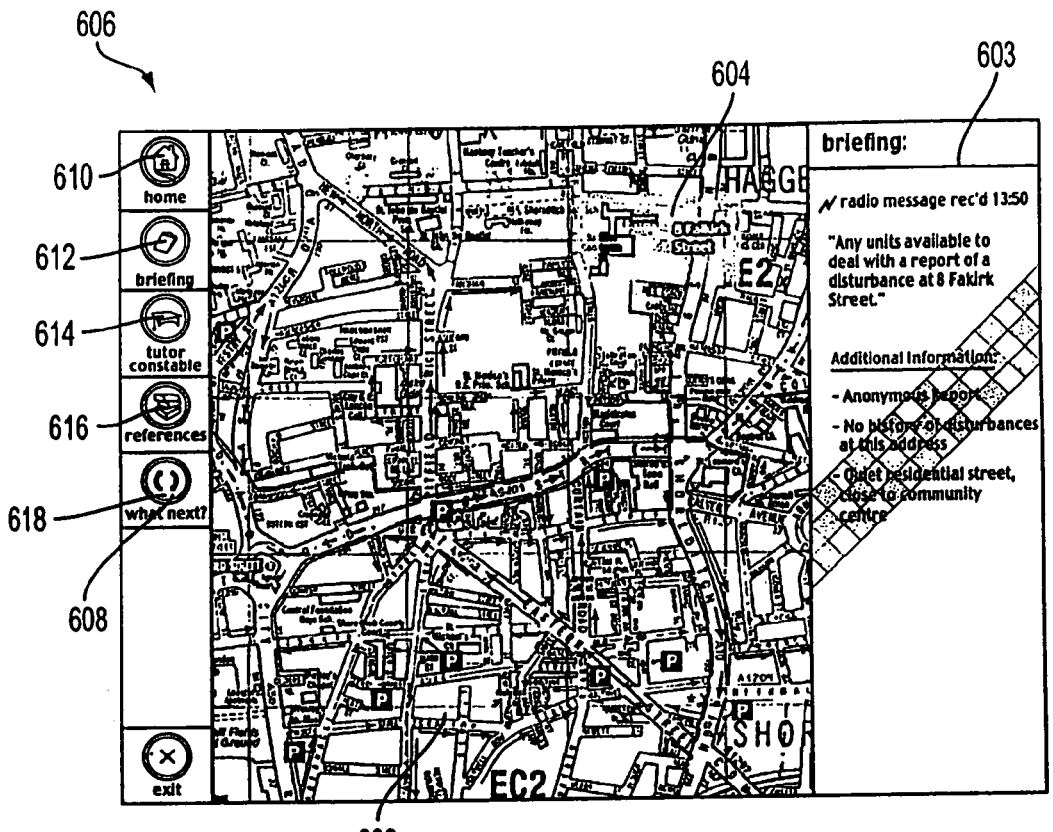
FIG. 6 is an initial screen of the validation portion of the present invention that follows the screen of FIG. 2.

FIG. 6 shows a first screen associated with the validation portion of the present invention. The following buttons are present on the screen of FIG. 6.

Home (610)
Briefing (612)
Coach (614)
References (616)
What Next (618)
Exit (620)

The toolbar along the left-hand side of the screen is populated with the foregoing buttons, and may or may not be available to the user. The functions associated with the foregoing buttons will now be set forth.

Home (610)—this reacts as before and provides the learner with the screen of FIG. 2

Briefing (612)—the learner can use this to repeat the radio message associated with the screen of FIG. 6, as will be described hereinafter Coach (614)—the learner can request feedback from the virtual coach at 'point of need', the feedback is tailored to the learners need dependent upon progress and the decisions that they have made so far What Next (616)—this is navigational help so that the learner does not feel frustrated or lost when using the application Exit (618)—reacts as before and closes the application. It should be noted that one of the benefits of online training is that it is user driven, the learners' progress is recorded by the computer so that they can either complete the course in one sitting or 'drop in and out' as time allows References (620)—this links into existing Police knowledge capital for example: procedures, stories from experienced officer, culture awareness issues, etc. Although the information here is just a 'placeholder', by linking the training directly to existing knowledge, this form of training can be particularly successful. Rich support structures provide the learner with all the information at their fingertips, allowing them to make an informed decision.

Figure 6A:
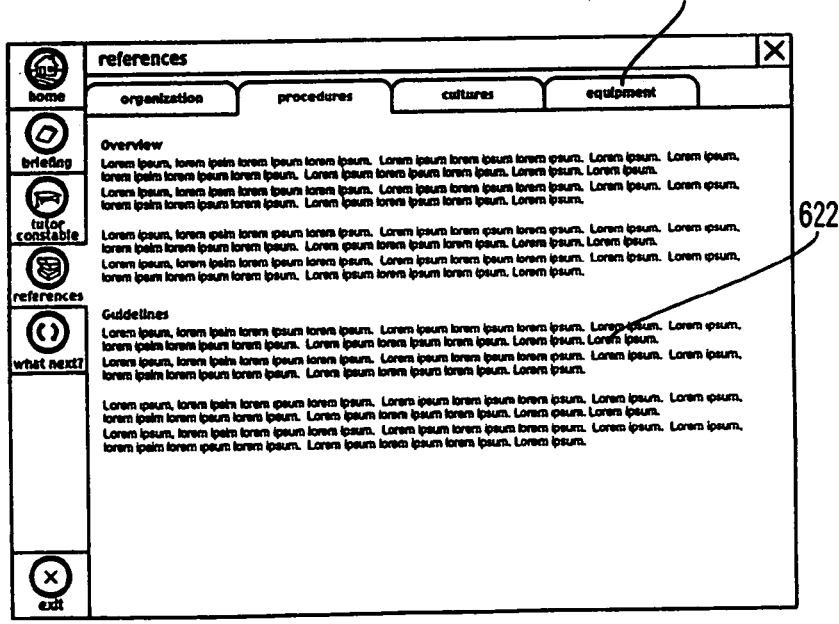
FIG. 6A is a screen of the validation portion of the present invention that includes reference material.

FIG. 6A is an illustration of the References screen 620. As shown, the References screen 620 includes a plurality of overlaid pages 622 which are each accessible by clicking on a tab 624 associated therewith.

As shown in FIG. 6, a briefing screen 602 appears which is accompanied by an audio sample including a voice over mimicking a police radio call that briefs the learner about the incident to which they are to attend. A panel 603 along the right hand side of the screen gives details of the learners briefing "Domestic incident reported at 8, Falkirk St please attend and interview neighbors"

Multiple areas 604 may be highlighted on the map each corresponding to a different scenario. A toolbar 606 along the left hand side of the screen has been populated with multiple buttons 608 the details for which have been set forth hereinabove.

While the audio sample may relate to any type of stimulus, a domestic incident may be chosen as the example scenario. Once listening to the audio sample, the appropriate area on the briefing screen 602 may be selected.

Figure 7:
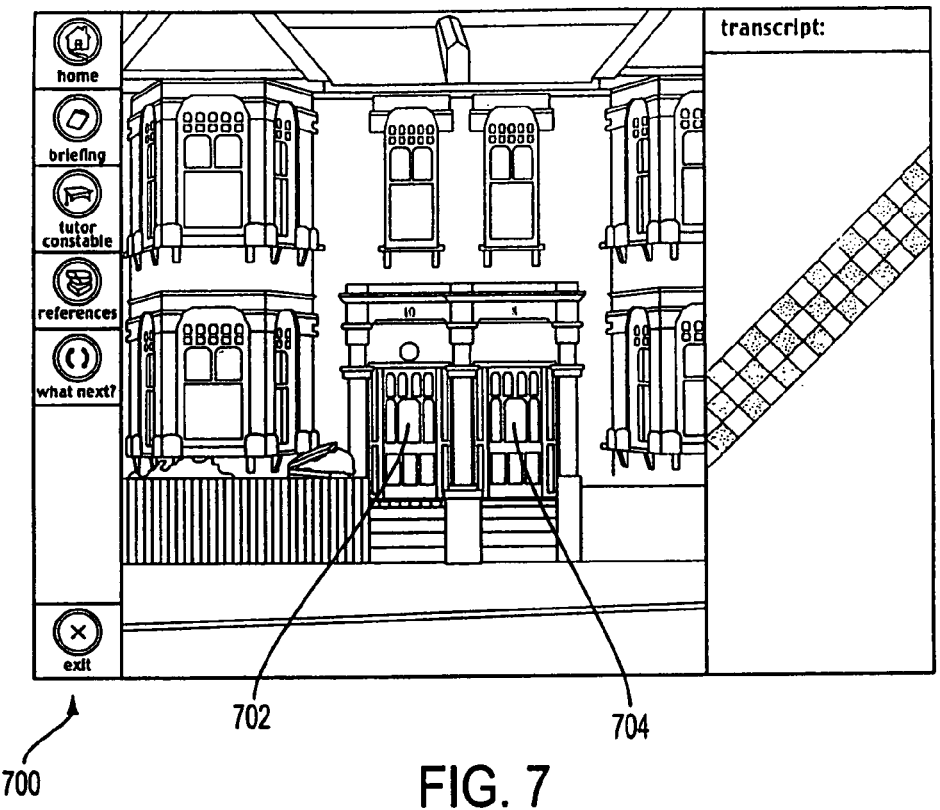
FIG. 7 is another initial screen of the validation portion of the present invention that follows the screen of FIG. 6.

Upon selection of the appropriate area on the briefing screen 602, a street scene screen 700 appears which includes a pair of doors 702 and 704, as shown in FIG. 7. By moving an icon on the two doors on the screen, each highlights and may be selected by simply clicking on the same. Upon clicking, the user may interview the neighbors. As an option, no one maybe at home in the house where the disturbance was reported This may be indicated by way of a pop-up window.

Figure 8:
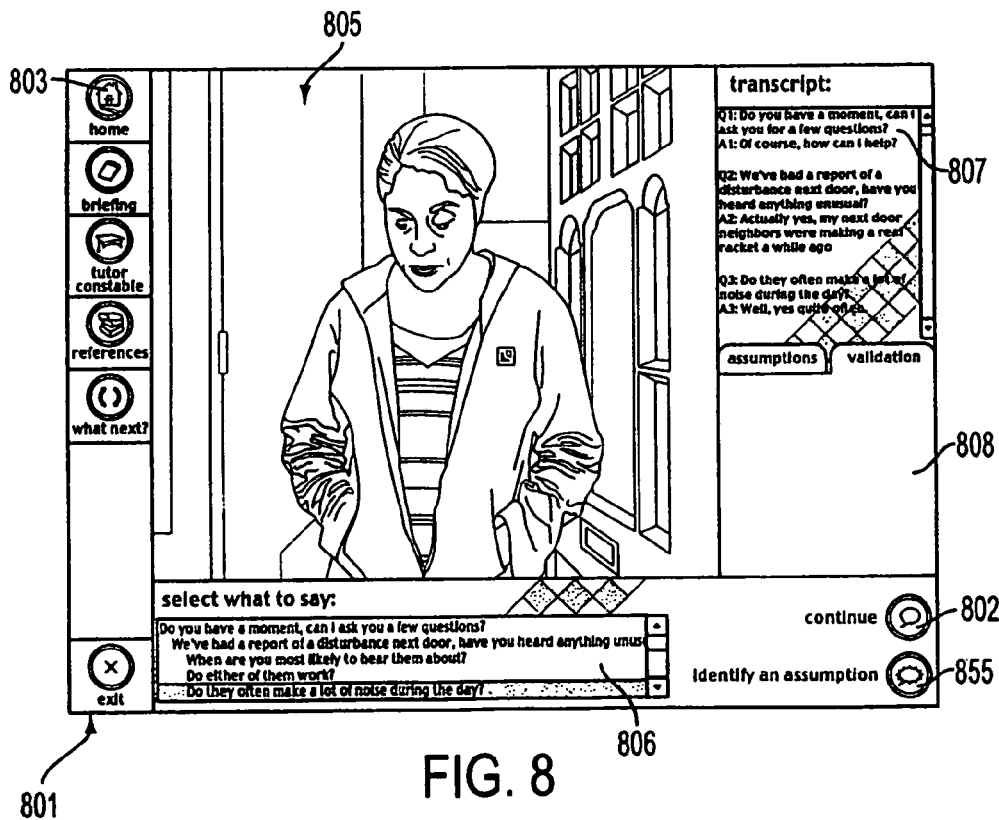
FIG. 8 is a screen of the validation portion of the present invention that follows the screen of FIG. 7.

After selecting one of the doors, a close up of a person answering the door may appear. FIG. 8 shows such screen which includes a central interface 801 for the validation portion of the present invention. Such interface 801 is adapted for providing a computer implemented training session. Provided is a navigation bar 803 which as the Home, Briefing, Coach, References, What Next, and Exit buttons similar to those of FIGS. 6 and 7.

The interface 801 further includes a first frame 805 for displaying an image or video presentation. Also on the interface is a first text box 806, for displaying multiple choice questions relating to the presentation. A second frame 807 is included for displaying a transcript of the training session. Such transcript includes the questions selected from the first text box and answers generated based on the questions.

For illustrating comments entered by the user during the training session, a second text box 808 is provided. As will be set forth hereinafter, comments entered by the user during the training session may be entered via a pop-up window. As an option, the second text box 808 includes at least two overlaid pages in the form of a folder.

The first text box 806 includes an 'Ask' list box. The 'Ask' list box contains a number of questions that the learner can use to interview the neighbor with more questions appearing as the interview progresses. During this phase of the training, the learner asks questions and is asked to recognize when they are making assumptions, and then to validate those assumptions.

A continue button 802 is also included on the screen of FIG. 8. The continue button 802 is used after selecting a question, to effectively ask the neighbor the selected question. The second text box 807, or the 'Transcript' scrolling text box'", displays the questions that the learner has asked along with the responses from the interviewee.

Figure 8A:
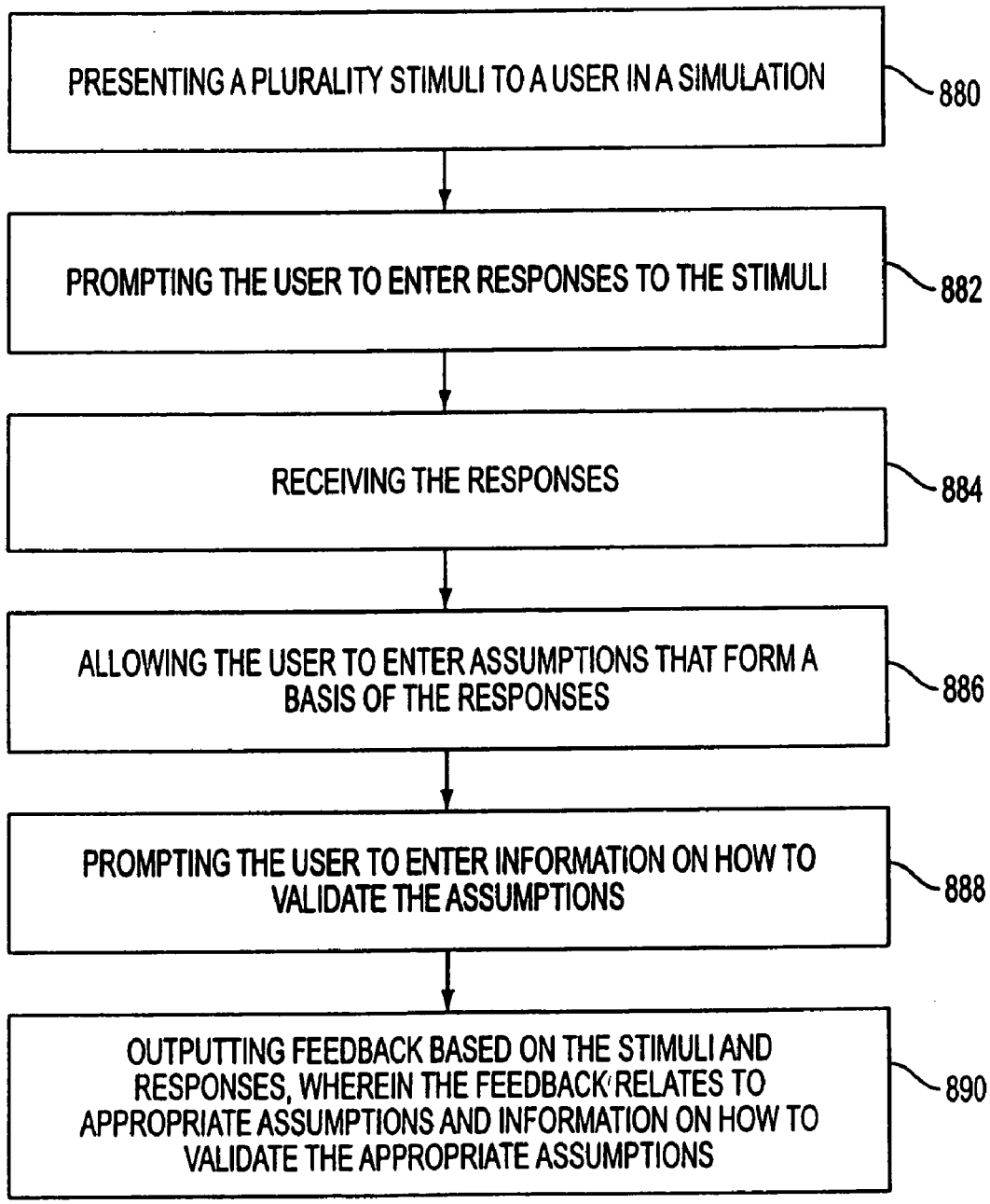
FIG. 8A is a flowchart of a process associated with the validation portion of the present invention.

Using the foregoing interface, a method of teaching validation of assumptions is implemented. FIG. 8A illustrates an outline of such method which begins by a plurality stimuli being presented to a user in the context of a simulation in operation 880. In one embodiment, the stimuli may include a prerecorded audio clip, a prerecorded video clip, an animation, a graphic, a text presentation, a real-time audio stream, and/or a real-time video stream in the first frame 805 of FIG. 8.

The user is then prompted to enter responses to the stimuli in operation 882. Such responses are subsequently received and recorded in operation 884. The responses may include questions for the person in order to collect evidence pertinent to the situation. Further, the user may be prompted to enter the responses to the stimuli by listing a plurality of responses in the first text box 806 of FIG. 8, and allowing the user to select between the listed responses. As an option, the stimuli and the responses are displayed after the receipt thereof in the form of a transcript in the second text box 807 of FIG. 8 during the course of the simulation.

The user is then allowed to enter assumptions that form a basis of the responses, as indicated in operation 886. Next, the user is prompted to enter information on how to validate the assumptions which is subsequently received in operation 888. The user may be automatically prompted to enter the assumptions that form the basis of the responses and the information on how to validate the assumptions. Similar to the responses and stimuli, the assumptions and the information on how to validate the assumptions may be displayed after the receipt thereof during the course of the simulation in the second text box 808 of FIG. 8.

Feedback is then outputted based on the stimuli and responses in operation 890. Such feedback relates to appropriate assumptions and information on how to validate the appropriate assumptions. As an option, the feedback may be further based on a number of assumptions entered.

In the present example shown in FIG. 8, upon the stimuli, i.e. the person answering the door, being presented to the user, the user is prompted to enter a response by selecting a question from first text box 806 to ask the person. Once selected, the continue button 802 is selected which prompts the person in the first frame 805 to answer in an audio format. Such question and answer are then ordered and enumerated in the transcript that is shown in the second frame 807 through the course of the simulation. This is continued until a question is chosen that requires an assumption to be made.

Figure 8B:
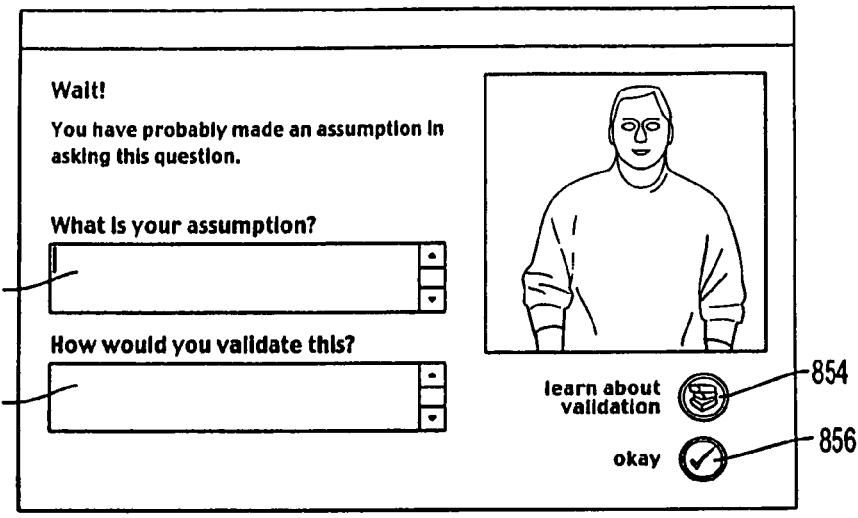
FIG. 8B is an illustration of a pop-up window associated with the validation portion of the present invention that follows the screen of FIG. 8.

FIG. 8B shows a pop-up window which is automatically displayed when a question is chosen from the first text box 806 that requires an assumption. At this point, the virtual coach appears explaining to the learner that to have asked the question they did, they probably had to have made an assumption. The pop-up window prompts the learner to explain the assumption they made and how they would expect to validate that assumption. As shown, the user is prompted to enter an assumption and information on how to validate the assumption in the text boxes 850 and 852, respectively. As an option, an additional information button 854 may be included for providing more information on validation.

Figure 8C:
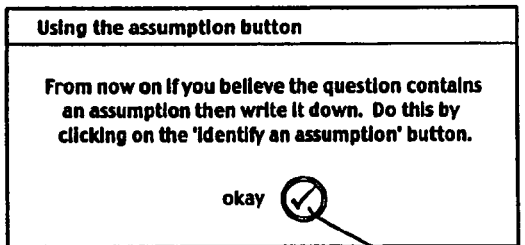
FIG. 8C is an illustration of a pop-up window associated with the validation portion of the present invention that follows the pop-up window of FIG. 8B.

In the case of the question selected in FIG. 8 (Do they often make a lot of noise during the day), the assumption that has probably been made is that the neighbor is probably a housewife, and inside during the day. Once the information is entered, in boxes 850 and 852, the OK button 856 is selected which prompts another pop-up window shown in FIG. 8C. In such pop-up window 568, a reminder is given to the user to enter assumptions and validations when selecting questions by manually selecting the "identify an assumption" button 855 of FIG. 8 in order to prompt the pop-up window of FIG. 8B. After viewing the pop-up box 568, the OK button 869 may be depressed which returns the process to screen of FIG. 8.

The text that is entered on the pop-up window of FIG. 8B is then entered on a pair of overlaid pages in form of a folder in the second text box 808. In order to conserve space, only one of the pages may be viewed at once, and each page may be viewed by selecting the corresponding tab. From now on, if the learner finds that they are making an assumption, they click on the 'identify an assumption' button 855 and type in the assumption that they are making and how they would expect to validate it. If the learner chooses another 'loaded' question but does not select 'identify an assumption' button 855, they may be promoted automatically At the end of the scenario, the virtual coach returns and dependent upon the number of assumptions the learner identified (and optionally on the text they typed in), the user is provided feedback on their performance. The coach point outs that the learner identified some key points where assumptions and validations would need to be made.

The virtual coach also explains that the transcript of the interview along with the assumptions and validations that the learner made have now been submitted to a 'live' coach, who may discuss them further.

There is particular value in having a live coach or group discussion at this point, not only for the reflective value, but also as a gauge of what the learner is actually learning. The learner further has the opportunity to view a video/audio clip including an anecdote from an experienced officer relating his or her experience in a similar situation, and the mistakes they made and how they learned from the situation.

'Lessons learned' are an important learning tool as points of reflection for knowledge sharing; reassurance and validation of the learner's behavior. And from the trainee's point of view, if the war story is delivered by a recognized and respected Officer, they also add credence to the training.

In one example, the officer had been in a similar position to the user; the witness was a young West Indian male, and throughout the interview he would not meet the Officer's eye. However, because of the prior cultural awareness training that the officer had had, he did not make the assumption that the witness was uneasy.

Instead he concluded that the witness would not meet his eye because in West Indian culture it is a sign of respect to not directly meet the eye of a senior.

Action

When desired, the action portion of the present invention may be accessed by clicking on the home button on a current screen and returning to the main screen of FIG. 2. At the main screen, the action button may then be depressed.

Figure 9A:
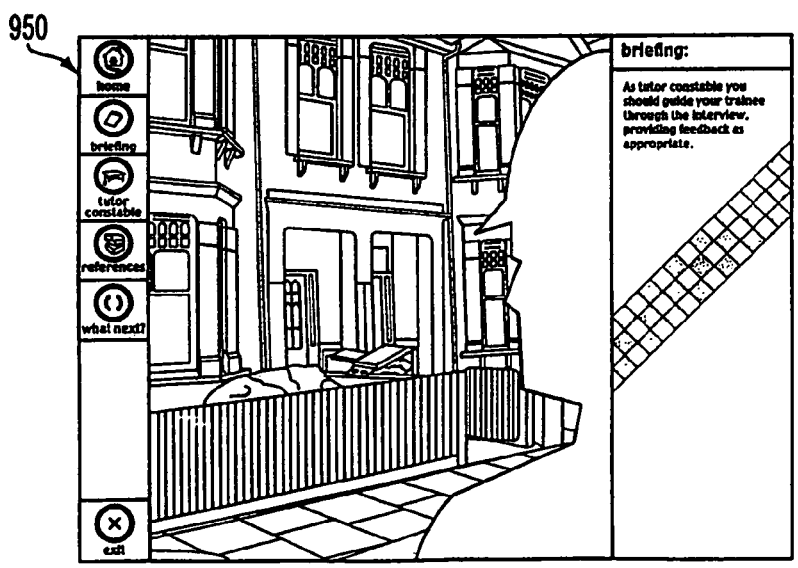
FIG. 9A is an illustration of a screen of the action portion of the present invention.
Figure 9:
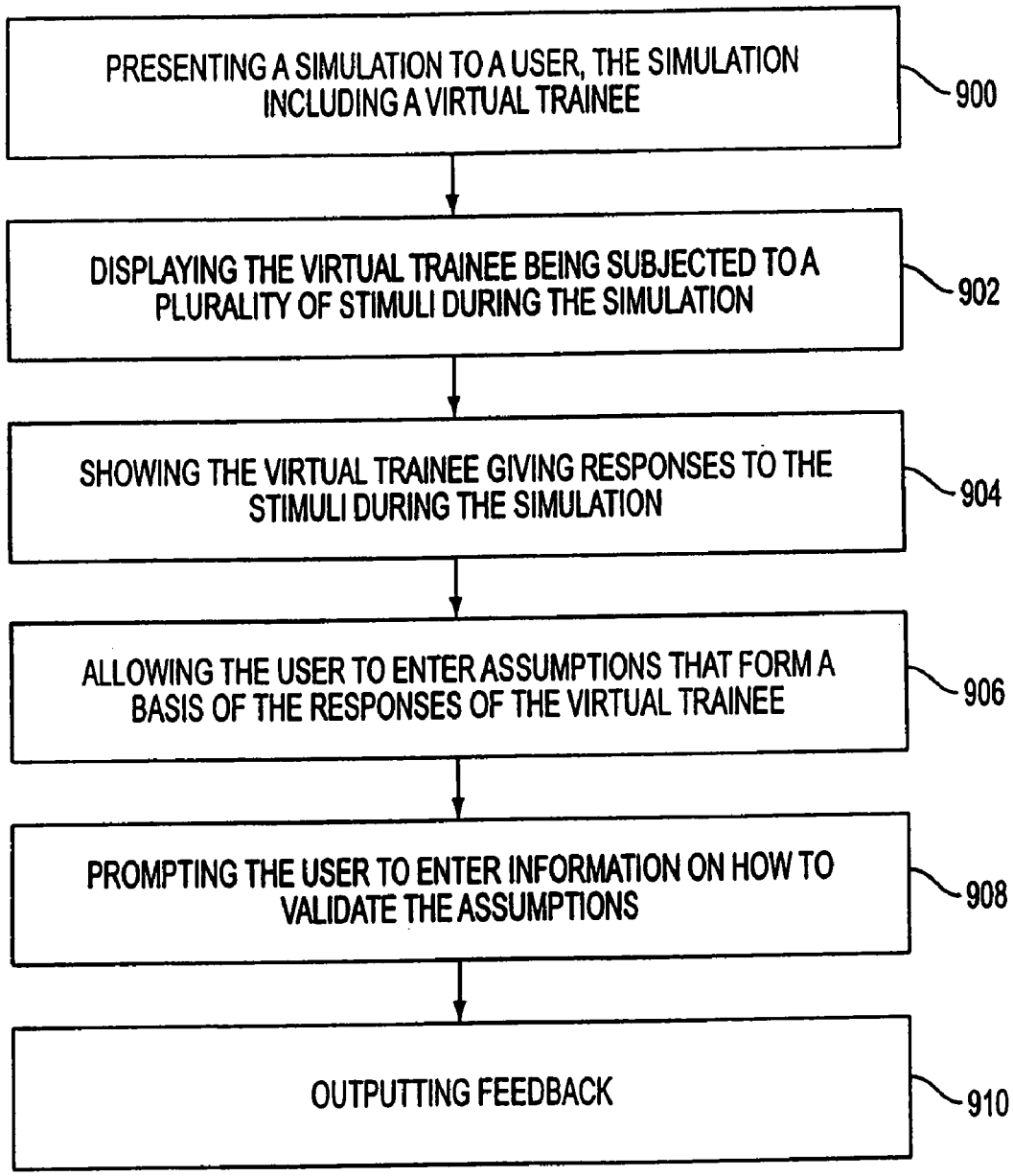
FIG. 9 is a flowchart of a process associated with the action portion of the present invention.

The Action portion of the present invention provides a computer implemented training session for training a user on assumptions by reversing a role of the user from a trainee to a trainer. An outline of such session is shown in FIG. 9. First, a simulation is presented to a user in operation 900. Such simulation includes a virtual trainee. During the simulation, the virtual trainee is subjected to a plurality of stimuli. Note operation 902. In one embodiment, the stimuli includes a prerecorded audio clip, a prerecorded video clip, an animation, a graphic, a text presentation, a real-time audio stream, and/or real-time video stream.

Then, in operation 904, the virtual trainee is showed giving responses to the stimuli during the simulation. At this point, the user is allowed to enter assumptions that form a basis of the responses of the virtual trainee, as indicated in operation 906. The user is then prompted to enter information on how to validate the assumptions in operation 908.

The assumptions and the information on how to validate the assumptions may be displayed after the receipt thereof during the course of the simulation. As an option, the user may be automatically prompted to enter the assumptions that form the basis of the responses and the information on how to validate the assumptions.

Finally, feedback is outputted in operation 910. During the course of the simulation, the user may be given access to a knowledge base including information on assumptions and validation. A sample screen 950 for the action portion of the present invention is shown in FIG. 9A.

The learner now has the opportunity to remediate a virtual learner on their performance in a scenario similar to that of the validation portion of the invention and practice any new behavior they have learned. In the previous situations in the validation portion of the present invention, the coach explains the learner's role and goal to them. In this case, however, the user now change roles and plays the part of a coach to the new 'virtual' user. The new virtual user walks through a similar scenario to the one that the learner has just completed. However, this time it is up to the learner to point out to the virtual officer the points in the interview when they are probably making assumptions and the likely avenues for validation that they might try. Learning by teaching is the only more effective way of learning other than 'learning by practice'.

And at the end of the present section, the coach returns and encourages the learner to reflect on what they have learned. Now that the learner has become aware of assumption making and the necessity for validating their assumptions, they must also learn the appropriate new behaviors for when they find they have made erroneous assumptions. For example, having taught the learner that the way they were behaving with an elderly Muslim gentleman was inappropriate they must relearn what is acceptable behavior.

The end of the session would be an ideal time for the user to analyze real scenarios from their early training, offline with their 'Tutor Constable'.

Observations for the Police Service on Changing Behavior and Culture in Business An organization's culture is not very susceptible to change through conventional training. Where new behaviors are taught, they do not survive well outside the classroom. Where new policies and procedures are taught they do not make an impact on the underlying behaviors, assumptions or attitudes. This is for several reasons:

Training is often not widely and freely available when needed. The result is that training does not reach potential trainees at the places and times needed to have an effect on culture.

Delivery of training often depends upon a 'cascade', from an initial cadre of highly-motivated and well-informed trainers and policy leaders, via 'second generation' trainers and managers who have less expertise in both the content and the method of training, to a third generation, and so on. The result is that the messages to be conveyed by training are degraded and unclear by the time they reach many of the rank and file trainees. The original culture then allows existing supervisors and poor role models to fill the vacuum.

People's behavior is a product of deeply learned lessons. 'Unlearning' them is hard. Training offers new lessons but does not help trainees unlearn their old lessons. Nor does it help trainees to resist the many cues to return to their old habits that they encounter after finishing the training and returning to the job. The result is that any changes in trainee behavior that are produced by training do not last long in the workplace.

Training is not delivered across the whole trainee population simultaneously, so it does not remove the poor role models that are encountered everyday by returning trainees. These poor role models undermine the effect of training for each trainee—culture has a robust immune system. The result is that early trainees are re-absorbed by the old culture, and then they themselves are there to re-absorb later trainees.

Many organizations now recognize these deficiencies of using conventional training as a means of eliminating the weaknesses in a culture. The professional response has been to apply a collection of additional and alternative techniques. For example, as additions:

Organizations provide new role models for their people. They deliberately induct new people who do not share the existing culture. This is sometimes done en masse (as in a merger or acquisition), or it is done one-by-one, by recruitment or recommendation from outside. These new people provide role models for different ways of behaving and for different assumptions and beliefs to hold. They possess and demonstrate the new skills required. Organizations may also second influential members of staff into the outside world, so that they can return having experienced other role models.

Leaders make extreme efforts to 'stand up and be counted as speaking out against the weaknesses in the existing culture. This may be done on an internal stage, and also in public.

Organizations create a new 'mythology' and new 'heroes' to demonstrate and promote the desired culture. For example, in-house publications prominently feature staff who are displaying the desired behaviors, and leaders repeatedly cite anecdotes which commend such staff This is not done to make out that change has happened when it has not, but to make clear that change is welcomed, rewarded and celebrated whenever it has.

Ceremony is established around the efforts to change the culture. This may take the form of introducing awards for conspicuously desirable behaviors, of overtly changing reward and promotion criteria to require the display of such behaviors, etc.

Each of these techniques is helpful to the process of changing culture and behavior, but the most successful organizations are those which are also applying principles from cognitive psychology to their training and personal development programs. These principles lead to programs that are vastly more effective than conventional training at changing behaviors, assumptions, and beliefs amongst staff.

5 Principles from Cognitive Psychology

It has been found that the most effective and successful programs for adult training and personal development meet five design principles from cognitive psychology. In layman's terms:

1. People learn from experience.
2. Feedback and coaching that is expertly given is essential to learners.
3. "Practice makes perfect."
3. An environment that is as similar to real work as possible, whilst being 'risk free', is most conducive to learning.
4. Setting relevant goals, with learners allowed to pursue them at their own pace, is what motivates learning.

Learning from Experience

People learn best when they attempt to defend the stances they take, justify the decisions they make, and understand how these relate to the consequences they find. Making errors is as instructive as getting it right, if the objective is to avoid those errors in future. All this is what happens when people experience a task for themselves, rather than being told about doing it, or watching someone else do it.

Conventional training styles (such as lectures, audio-visuals, demonstration and discussion) typically result in around 20% retention of information. Up to 80% of the information originally taught is not retained or retrievable by a trainee when needed. By contrast, 'learning by doing' typically results in 75% to 80% retention.

This principle is already recognized by most organizations, including the police service. Learning 'on the job' provides the experience by which many people learn the 80% of their job, trade or profession that was not taught by their conventional training.

Role plays are an attempt to follow this design principle to enrich conventional training—but too many role play courses involve many of their trainees only as observers for much of the time, or are too heavily scripted, for those trainees actually to 'learn by doing'. Such role plays become little more than structured opportunities to 'observe and discuss'.

First-hand experience of doing and behaving in the new way, and of the adverse consequences of behaving in the old way, is essential in instilling new behaviors.

Feedback, Support and Coaching

Roger Schank at the Institute of Learning Sciences has identified that people learn best when they can draw on expert advice and 'war stories' to help them to understand the problem being posed and to explore possible responses.

Positive feedback ('reinforcement') should be given to the learner when desired behaviors are used. Constructive feedback ('criticism'), including an explanation of why adverse consequences have followed, should be given when the wrong behaviors are used. Both should be given in a manner that is acceptable to the learner. This level of support requires sophisticated and responsive feedback mechanisms, as well as expert coaches to deliver the feedback well.

An expert should follow the progress of someone who is being trained to ensure that they are experiencing the right behaviors, not the wrong ones, and to give immediate advice and redirection if not. This is how apprenticeships "at the feet of a master" have worked so well at passing skills down the centuries. It is also why organizations in which new people work closely with 'old hands' can have persistent cultures, for good and bad.

"Practice makes Perfect"

Michael Howe, professor of psychology at Exeter University, has looked at outstanding performances in the arts and sport to establish what produces excellence. He concluded that opportunity, encouragement, motivation, self-confidence but—most of all—practice, determine excellence. The more a learner repeats an exercise, the more skilled and proficient he or she is likely to become. Practice is fundamental to the development of proficiency, in mental as well as physical disciplines, and therefore in behaviors.

Practice aids memory through repetition. If one says the same twenty numbers repeatedly he or she will eventually learn them by heart. Many people learned their "tables" and the alphabet this way. To do so, teachers probably broke the numbers down into groups whose rhythm or pattern helped people remember the sequence.

Practicing can boil much more complex tasks than knowing multiplication tables down into manageable patterns that aid memory.

The cockpit of a jet aircraft is highly complex, but with practice a pilot breaks this complexity down so that separate areas relate to separate portions of the plane or to certain functions in his memory. Flying a new aircraft means learning a new pattern, and takes time and practice.

Through practice, chess masters recognize patterns in the pieces on the board such that, without the full analysis that a powerful computer still cannot achieve, they can sense where threats and opportunities lie.

A police officer who has to decide what to do in complex situations will, during his or her years of service, have developed patterns to simplify those situations. These patterns need to contain the relevant information to trigger the desired new behaviors. Achieving this takes repetition—i.e. extensive practice—in which the new patterns and behaviors are practiced, and the old ones deliberately ignored. Imagine learning new tables where "5 times 9" is no longer "45", etc. Then take a test on them in the dark and in potential danger.

Context is Critical

Insufficiently relevant practice is useless. Similarity between the context in which the practice takes place and that where the real-life behavior must occur is essential. Information is stored in the brain with the context in which it was learnt. This context is used when trying to retrieve the information from memory into order to use it. It is part of the brain's index, regardless of whether the information stored is a new acquaintance's name, a chronology of the kings and queens of England, or the skill of dealing with an individual as an individual.

Research into the memory of elderly people has recently been carried out using scents to recreate the context in which information was stored in memory years ago. The scent of Blitz bombing was so effective in helping one man recall information that he could reel off the serial number of the rifle he used in the war, which he had not seen since.

Retrieving learned skills when they are needed in a different environment to that where they were learned is far more difficult. Ballet dancers may practice their individual movements in a classroom but to practice expert performance they take part in dress rehearsals, in full costume and on stage under the theatre lights, in front of an audience of colleagues. This simulates the context of the real performance and they practice performing. On opening night, they can reproduce this practice because the context is similar.

The context relevant to practice includes internal factors, not just similarity of the physical environment. Internal factors can be more important than the physical environment. Sportsmen visualize competition to create the mental context in which they can reproduce winning performances. Hypnotherapy helps people to recreate past contexts that can allow them to remember information that is otherwise inaccessible.

Conventional training seldom creates any relevant similarity between the context of the training—either the physical class- or lecture-room, or the mental state of the trainee—and the environments and circumstances in which the lessons learned have to be retrieved and applied. Analyzing these environments and designing a relevant context in which lessons should be learned is essential.

Motivation and Goals

People learn more readily if they are interested in something:
  they give the learning their more full attention, so the learning process becomes more efficient within their own time
  they persist with the learning exercise for longer, so it is more thoroughly 15 completed.

If one has a child who plays computer games, it may be considered how much more quickly proficiency is achieved in the more interesting games and how much longer those games are played. The most commercially successful computer games present goals that interest and engage, to the point of addiction. Training is a far more purposeful activity than computer gaming, and the skills learned in computer games are usually of little transferable value, but the principle of motivation is similar.

A 'goal-based exercise' is a problem presented in way that motivates a learner, by giving him or her a goal to achieve within a learning exercise. The goal encourages persistence in the exercise, whilst exploring and solving the problem within the exercise provides experience, practice if repeated, and therefore learning.

5 Practical Constraints on Training within the Police Service

Adult training and personal development programs that aim to change behavior are always subject to constraints that arise from the organization within which the program delivered, and from the nature of the job that trainees are doing.

For the police service:

The program needs to be very widely accessible. Everyone in the police service should be able to go on the program, regardless of his or her location around the country. To make this possible the program needs to be easy to transport and distribute to many locations. The program also needs to be quick to set up at each location so that officers can start using it.

The program needs to be completed by all officers as quickly as possible, without compromising its effectiveness. The sooner everyone starts applying the behaviors in the workplace, the greater the impact on the culture. This means the program should require a minimum amount of time for each individual officer to complete it, and a minimum passage of time for all officers to have completed it.

The program needs to be flexible enough to allow every officer to fit it into his or her work schedule. Everyone in the police service should go through the program, from the newest recruits to the most senior officers. The program should remain accessible to those who cannot allocate their time to it in a single block, so it should support different patterns of delivery.

The contents of the program must not degrade during a cascade. It should be delivered as designed, with a minimum of inadvertent or deliberate interference in the contents during delivery. To ensure the material teaches the right behaviors, the delivery needs to be objective, rather than subject to variability from trainer to trainer, place to place, or date to date.

The program needs to teach officers relevant procedural and policy material as well as new behaviors. The police service, and the system of justice, is dependent upon the skill and proficiency with which police officers execute formal procedures. Programs should combine behavioral change with reinforcement of these proficiencies.

A Shared Solution

The 5 principles and 5 constraints above should be recognized in building any training and personal development program that aims to change behaviors within the police service. To do so requires considerable professional expertise to be applied to the analysis and design of the coaching, the context, and the goals. The outcome of that expert design process could be constructed as training and development material in one of three possible forms:

'On the job training'.
Staged simulations.
Practice-based development packages.

Materials in these forms have been successfully employed on programs to change behavior and culture, in the business and voluntary sectors. The program aims have been as varied as combating alcohol dependency, increasing managerial decisiveness, converting instructors to effective coaches, introducing team-working, and effective negotiating. Each form of material has strengths and weaknesses when measured against the 5 principles and the practical constraints within the police service. But the generic design process by which material should be developed is established, proven and in use. This process, and the professional expertise that is required to perform it, can be shared with the public sector.

'On the Job' Training

'On the job training' would involve an officer being coached in new behaviors for police service by an expert, whilst on duty in real-life situations and surrounded by fellow officers and the public. Against each of the 5 principles:

'On the job training' has each trainee learning from his or her own experience.

'On the job training' can supply adequate feedback if supported by an expert coach who accompanies each trainee—but there are not enough people, who are both adequate new role models and talented coaches, to act in this capacity for all police officers.

Opportunities to repeat experience in order to perfect new skills are unreliable—they depend on whichever situations are encountered during the program, which makes the frequency of repetition somewhat slow and therefore less effective as practice.

'On the job training' is conducted in an environment that is very true to life.

The goals and motivation to engage the trainee are dependent on the situations encountered during the training period.

Against each of the practical constraints:

'On the job training' can be accessible at any location within the service.

It may take a considerable time before an officer has experienced each of the relevant situations in which he or she needs to learn and apply new behaviors, so the program could take considerable time to complete.

'On the job training' could be tailored to individuals' availability and learning requirements but the supply of suitable experiences would be difficult to match to their needs 'on demand'.

'On the job training' would be delivered at local sites by local coaches so there is considerable risk of subjectivity being introduced to the material and its interpretation by local coaches. 'On the job training' occurs amongst poor role models as well as good, and it is likely that trainees therefore practice bad habits as well as good.

'On the job training' allows for specific policy and procedural lessons to be incorporated.

For the police service, 'on the job training' would be highly dependent on the subjective interventions of the coaches who were available, and on enough opportunity for practice occurring during the routine duty of the training period. As a result, it is likely to deliver variable messages to trainees, and these messages are unlikely to have a lasting impact on them. To deliver in a reasonable period, 'on the job training' would also require more expert coaches and role models than are likely to be available. Without them, it would be unlikely to deliver much of a message in the first place.

Staged Simulations

Staged simulation involves role playing in a setting that mimics real-life incidents, using actors to create scenarios in which the trainee plays his or her own role. It differs from simple role playing in that the balance of scripting and the ability of the actors to improvise must allow the trainee a lot of freedom to alter the course of events by his or her behavior.

Against the 5 Principles

Staged simulation has trainees learning by doing, provided the actors fully understand the content to be covered and are credible improvisers—this is a considerable proviso on a large scale roll-out.

Expert support can be provided if an expert coach is available during the training sessions.

Scenarios can be repeated for practice but only as long as the actors are available on the stage for each trainee.

Staged simulation can create very realistic context, depending on the capabilities of the actors delivering the materials.

The trainee can be set challenging goals to reach and should be able to work towards them at his or her own pace (though this takes up the time of the many resources that are involved).

Against the Practical Constraints

Staged simulation is difficult and expensive to transport and set up in many different locations and it relies heavily on the availability of space, props, etc.

The space and personnel demands of staged simulation make it difficult to operate at volume.

These demands also make it difficult to operate staged simulation flexibly to the needs of trainees' personal schedules.

Staged simulation involves actors and improvisation, so there is considerable risk of the training becoming subject to the behaviors and interpretations of the actors.

Staged simulation allows for specific policy and procedural lessons to be incorporated.

Staged simulation is an effective way of delivering personal development training to compact audiences. However, for the police service it has very substantial logistical difficulties, particularly in providing enough capacity for every trainee to obtain adequate practice. Staged simulation also depends heavily upon the availability of sufficient numbers of capable actors. And the actors can subjectively influence the messages delivered since they must be allowed the latitude for improvisation yet they control the scope and content of the trainees' experience. Staged simulation is likely to be scalable for the police service.

Practice-based Development Packages

Practice-based development packages provide trainees with multi-media computer software to perform exercises in a 'virtual world' simulation—rather like a flight simulator with less hardware and more psychology. They combine repeatability of each exercise, with the mass reproduction of the best expertise for all trainees, with the ability of software to respond from a repertoire rather than either from an overly simple script or by free improvisation.

Against the 5 Principles

Multi-media packages create a 'learning by doing' experience, but one that is without real life risk yet can demonstrate the consequences of different behaviors.

A repertoire of expert support and advice can be available to the trainee at all times. A virtual coach cannot fully replace a human coach, but does make expert feedback available to all trainees, all of the time, for most of the issues they have.

The exercises are readily repeatable and participants can practice exactly as suits their pattern of daily work.

Multi media technology, combined with expert cognitive. Analysis, allows extremely authentic mental environments to be created. Physical context cannot be properly recreated.

Goals are designed into each exercise and a trainee can work towards them at his or her own pace.

Against the Practical Constraints

Computers and software are portable and can be made widely accessible. This may require capital expenditure to provide universal access (although the computers themselves are then reusable for other purposes).

There is no single logistical bottleneck in the delivery process to all trainees. Large numbers of trainees can complete the program simultaneously if this is operationally desirable.

Packages are run by each individual trainee, who controls his or her own progress through the training scenarios without dependence on anyone else—coach, actor or colleague.

Recorded materials are not subject to interpretation by trainers during delivery. They do not degrade down a cascade but continuously deliver the original content as designed.

Procedural and policy content can be embedded in the material.

Practice-based development packages on multi-media are an effective way of delivering personal development training, and are scalable to the extent needed by the police service. They can provide every trainee with first-hand experience, freedom to practice, and coaching 'on demand'.

Such packages also eliminate subjectivity from the delivery—once material has been developed, it reaches every trainee precisely as "signed off." And once released, its logistics allow the program to be completed by everybody in a short period.

Practice-based development packages should be the core material in any training and personal development program that aims to change behaviors and culture within the police service. The full content of a program with this at its core might include:

face-to-face induction to the program by senior officers—perhaps in small-group presentations and Q&A sessions
  the practice-based development packages themselves
  a virtual classroom providing access to expert advice and peer discussion outside the packages (and for trainees to use post-training)—this might be web-based
  examinations, less for evaluation of trainees' learning than as another form of practice—perhaps in 'multiple-choice-with-reasons' style
  a 'passing out' ceremony—this might be newsletter-based rather than a physical event.

Two Codicils

The design of a program in accord with the principles and constraints discussed in this submission is a professional discipline. So is the creation of multi-media software. An effective program cannot be designed without expert use of the know-how and methods of both, together with professional knowledge of the nature of policing and consensus amongst policy-makers on the specific behaviors to be trained. None of the proposals advanced in this submission is intended to address so-called "bad apples"—the community of those who exploit and extrapolate the current culture, as opposed to simply tolerating and conforming to it. But if the culture is changed for all around them, then those around them and their leaders can more readily isolate and deal with this community.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A computer program embodied on a computer readable medium for providing a computer implemented training session for identifying a user's assumptions in light of a reaction to a stimulus, the computer program comprising:
    (a) a code segment for presenting a first portion of a stimulus to a user;
    (b) a code segment for prompting the user to enter a reaction to the first portion of the stimulus;
    (c) a code segment for receiving the user's reaction to the first portion of the stimulus;
    (d) a code segment for recording the user's reaction to the first portion of the stimulus;
    (e) a code segment for prompting the user to enter an assumption that forms a basis of the user's reaction;
    (f) a code segment for presenting a second portion of the stimulus to the user; and
    (g) a code segment for providing feedback to the user adapted to identify how the user's reaction was based on the assumption.

2. A computer program for providing a computer implemented training session as recited in claim 1, wherein the user's reaction to the stimulus includes at least one of a text entry and a choice of presented options.

3. A computer program for providing a computer implemented training session as recited in claim 1, wherein the feedback is provided by an interactive coach.

4. A computer program for providing a computer implemented training session as recited in claim 1, wherein the stimulus includes at least one of a prerecorded audio clip, a prerecorded video clip, an animation, a graphic, a text presentation, a real-time audio stream, and a real-time video stream.

5. A computer program for providing a computer implemented training session as recited in claim 1, further comprising a code segment for providing the user access to a knowledge base.

6. A computer program for providing a computer implemented training session as recited in claim 1, further comprising a code segment for deploying the training session on a computer network using at least one of local area network protocol, wide area network protocol, Internet protocol.

7. A system for providing a computer implemented training session for identifying a user's assumptions in light of a reaction to a stimulus, the training session comprising:
    (a) a processor;
    (b) a memory that stores programming information under control of the processor;
    (c) logic for presenting a first portion of a stimulus to a user;
    (d) logic for prompting the user to enter a reaction to the first portion of the stimulus;
    (e) logic for receiving the user's reaction to the first portion of the stimulus;
    (f) logic for recording the user's reaction to the first portion of the stimulus;
    (g) logic for prompting the user to enter an assumption that forms a basis of the user's reaction;
    (h) logic for presenting a second portion of the stimulus to the user; and
    (i) logic for providing feedback to the user adapted to identify how the user's reaction was based on an assumption.

8. A system for providing a computer implemented training session as recited in claim 7, wherein the user's reaction to the stimulus includes at least one of a text entry and a choice of presented options.

9. A system for providing a computer implemented training session as recited in claim 7, wherein the feedback is provided by an interactive coach.

10. A system for providing a computer implemented training session as recited in claim 7, wherein the stimulus includes at least one of a prerecorded audio clip, a prerecorded video clip, an animation, a graphic, a text presentation, a real-time audio stream, and a real-time video stream.

11. A system for providing a computer implemented training session as recited in claim 7, further comprising logic for providing the user access to a knowledge base.

* * * * *